United States Patent
Yi et al.

(10) Patent No.: US 10,772,117 B2
(45) Date of Patent: Sep. 8, 2020

(54) METHOD AND USER EQUIPMENT FOR RECEIVING DOWNLINK SIGNAL

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/316,023

(22) PCT Filed: Jul. 6, 2017

(86) PCT No.: PCT/KR2017/007215
§ 371 (c)(1),
(2) Date: Jan. 7, 2019

(87) PCT Pub. No.: WO2018/008995
PCT Pub. Date: Jan. 11, 2018

(65) Prior Publication Data
US 2019/0159234 A1    May 23, 2019

Related U.S. Application Data

(60) Provisional application No. 62/359,700, filed on Jul. 7, 2016, provisional application No. 62/359,701, filed on Jul. 7, 2016.

(51) Int. Cl.
*H04W 72/12* (2009.01)
*H04W 72/04* (2009.01)
(Continued)

(52) U.S. Cl.
CPC ....... *H04W 72/1278* (2013.01); *H04L 5/0048* (2013.01); *H04L 5/0096* (2013.01);
(Continued)

(58) Field of Classification Search
CPC ... H04L 5/0091; H04L 5/0096; H04L 5/0048; H04L 5/0053; H04L 5/0007;
(Continued)

(56) References Cited

U.S. PATENT DOCUMENTS

2011/0223924 A1    9/2011 Lohr et al.
2012/0172044 A1    7/2012 Wu
(Continued)

OTHER PUBLICATIONS

U.S. Appl. No. 15/644,595, Office Action dated Sep. 19, 2018, 14 pages.
(Continued)

*Primary Examiner* — Mehmood B. Khan
(74) *Attorney, Agent, or Firm* — Lee Hong Degerman Kang Waimey

(57) ABSTRACT

In the present invention, a user equipment (UE) receives semi-persistent scheduling (SPS) configuration information on N SPS resource configurations, where N is an integer larger than 1. The UE receives an SPS command to activate or deactivate each of multiple SPS resource configurations among the N SPS resource configurations. The UE performs downlink reception or uplink transmission in an SPS resource corresponding to an SPS resource configuration among activated SPS resource configurations. The SPS command includes information indicating each of the multiple SPS resource configurations and information indicating whether a corresponding SPS resource configuration is activated or deactivated.

12 Claims, 7 Drawing Sheets

(51) Int. Cl.
*H04L 5/00* (2006.01)
*H04W 80/02* (2009.01)

(52) U.S. Cl.
CPC ..... *H04W 72/042* (2013.01); *H04W 72/0406* (2013.01); *H04W 72/0446* (2013.01); *H04L 5/0007* (2013.01); *H04W 80/02* (2013.01)

(58) Field of Classification Search
CPC ......... H04W 72/0406; H04W 72/0446; H04W 72/1278; H04W 72/042; H04W 80/02
See application file for complete search history.

(56) References Cited

U.S. PATENT DOCUMENTS

| | | |
|---|---|---|
| 2014/0023008 A1 | 1/2014 | Ahn et al. |
| 2014/0161069 A1* | 6/2014 | Ohta ................... H04L 5/00 370/329 |
| 2015/0223212 A1 | 8/2015 | Der Velde et al. |
| 2016/0128066 A1* | 5/2016 | Park ................... H04W 16/14 370/329 |
| 2017/0019887 A1 | 1/2017 | Jiang et al. |
| 2017/0071010 A1 | 3/2017 | Lim et al. |
| 2017/0118701 A1 | 4/2017 | Kim et al. |
| 2017/0289733 A1 | 10/2017 | Rajagopal et al. |
| 2018/0167930 A1 | 6/2018 | Huang et al. |
| 2018/0184439 A1 | 6/2018 | Lee et al. |
| 2019/0045337 A1* | 2/2019 | Sun ................... H04W 72/1289 |
| 2019/0045507 A1 | 2/2019 | Sorrentino et al. |
| 2019/0082454 A1* | 3/2019 | Shi ................... H04W 72/0406 |

OTHER PUBLICATIONS

PCT International Application No. PCT/KR2017/007215, Notification of Transmittal of the International Search Report and the Written Opinion of the International Searching Authority, or Declaration dated Oct. 24, 2017, 10 pages.
U.S. Appl. No. 15/644,595, Final Office Action dated Mar. 26, 2019, 13 pages.
Samsung, "Multiple SPS configuration support for SL", 3GPP TSG RAN WG1 Meeting #85, R1-164762, May 2016, 5 pages.
Qualcomm, "eNodeB signaling for SPS resource allocation", 3GPP TSG RAN WG1 Meeting #85, R1-164421, May 2016, 4 pages.
Huawei, et al., "Discussion on UL RS for short TTI", 3GPP TSG RAN WG1 Meeting #85, R1-164063, May 2016, 4 pages.
ZTE, "Trigger and release of V2V SPS resources", 3GPP TSG RAN WG1 Meeting #85, R1-164963, May 2016, 4 pages.
CMCC, "Discussion on SPS configurations", 3GPP TSG RAN WG1 Meeting #85, R1-164878, May 2016, 4 pages.
European Patent Office Application Serial No. 17824551.0, Search Report dated Jan. 30, 2020, 8 pages.
CATT et al., "Multiple patterns for UL SPS", R2-084841, 3GPP TSG RAN WG2 #63, Aug. 2008, 4 pages.
LG Electronics, "Discussion on details of (E)PDCCH for sidelink SPS", R1-164514, 3GPP TSG RAN WG1 Meeting #85, May 2016, 4 pages.

* cited by examiner (a) Control-Plane Protocol Stack (b) User-Plane Protocol Stack

METHOD AND USER EQUIPMENT FOR RECEIVING DOWNLINK SIGNAL

CROSS-REFERENCE TO RELATED APPLICATIONS

This application is the National Stage filing under 35 U.S.C. 371 of International Application No. PCT/KR2017/007215, filed on Jul. 6, 2017, which claims the benefit of U.S. Provisional Application No. 62/359,700, filed on Jul. 7, 2016, and 62/359,701, filed on Jul. 7, 2016, the contents of which are all hereby incorporated by reference herein in their entirety.

TECHNICAL FIELD

The present invention relates to a wireless communication system, and more particularly, to a method for receiving downlink signals and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method of receiving, by a user equipment (UE), downlink signals. The method comprises: receiving, by the UE, semi-persistent scheduling (SPS) configuration information on N SPS resource configurations, where N is an integer larger than 1; receiving, by the UE, an SPS command to activate or deactivate each of multiple SPS resource configurations among the N SPS resource configurations; and performing, by the UE, downlink reception or uplink transmission in an SPS resource corresponding to an SPS resource configuration among activated SPS resource configurations. The SPS command includes information indicating each of the multiple SPS resource configurations and information indicating whether a corresponding SPS resource configuration is activated or deactivated.

In another aspect of the present invention, provided herein is a user equipment (UE) for receiving downlink signals. The UE comprises a radio frequency (RF) unit, and a processor configured to control the RF unit. The processor is configured to: control the RF unit to receive semi-persistent scheduling (SPS) configuration information on N SPS resource configurations, where N is an integer larger than 1; control the RF unit to receive an SPS command to activate or deactivate each of multiple SPS resource configurations among the N SPS resource configurations; and control the RF unit to perform downlink reception or uplink transmission in an SPS resource corresponding to an SPS resource configuration among activated SPS resource configurations. The SPS command includes information indicating each of the multiple SPS resource configurations and information indicating whether a corresponding SPS resource configuration is activated or deactivated.

In each aspect of the present invention, the SPS command may include a bitmap including N bits respectively corresponding to the N SPS resource configurations. Each bit of the N bits may be corresponding to an index of each of the N SPS resource configurations and indicates whether an SPS resource configuration corresponding to a bit of the N bits is activated or deactivated.

In each aspect of the present invention, the UE may activate an SPS resource configuration corresponding to a bit set to a first value among the N bits; and deactivate an SPS resource configuration corresponding to a bit set to a second value among the N bits.

In each aspect of the present invention, the SPS command may include an index of each of the multiple SPS resource configuration and an indicator indicating whether an SPS resource configuration corresponding to the index is activated or deactivated.

In each aspect of the present invention, the UE may maintain an activated or deactivated state of an SPS resource configuration not indicated by the SPS command.

In each aspect of the present invention, the SPS command may be received via a medium access control (MAC) signaling.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a BS may be reduced.

Also, it is possible to efficiently transmit/receive a small amount of data for smart devices, or efficiently transmit/receive data occurring at a low frequency.

Also, signals in a new radio access technology system can be transmitted/received effectively.

According to an embodiment of the present invention, a small amount of data may be efficiently transmitted/received.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
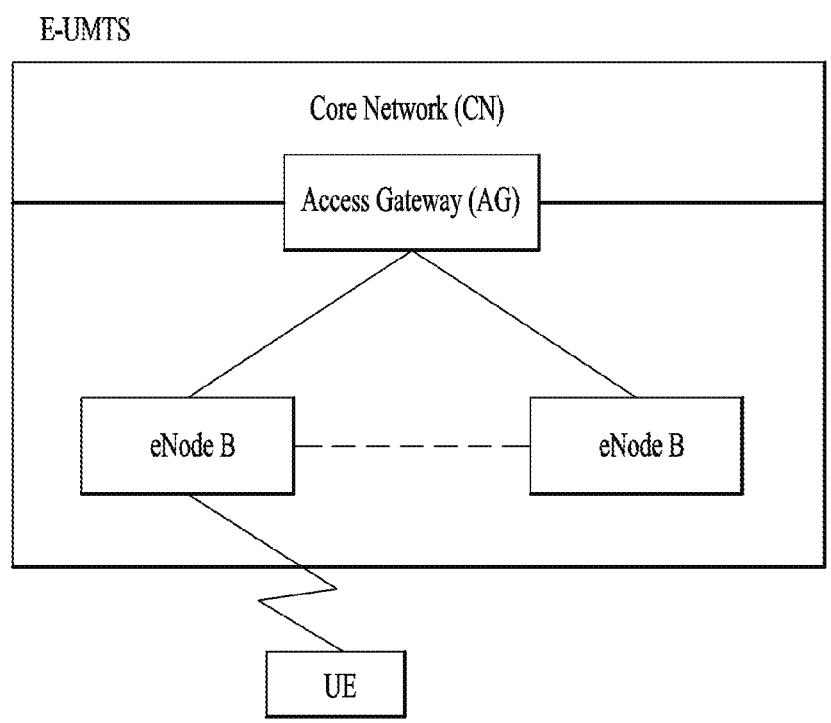
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems.

Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, "NB-IoT" denotes narrow band internet of things (NB-IoT) which allows access to network services via E-UTRA with a channel bandwidth limited to 200 kHz, and "NB-IoT UE" refers to a UE that uses NB-IoT.

In the present invention, "PDCCH" refers to a PDCCH, a EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present invention, for dual connectivity operation the term "special Cell" refers to the PCell of the master cell group (MCG) or the PSCell of the secondary cell group (SCG), otherwise the term Special Cell refers to the PCell. The MCG is a group of serving cells associated with a master eNB (MeNB) which terminates at least S1-MME, and the SCG is a group of serving cells associated with a secondary eNB (SeNB) that is providing additional radio resources for the UE but is not the MeNB. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, a timing advance group (TAG) refers to a group of serving cells that is configured by RRC and that, for the cells with an UL configured, using the same timing reference cell. A TAG containing the SpCell of a MAC entity is referred to as prmiary TAG (pTAG), whereas the term secondary TAG (sTAG) refers to other TAGs.

In the present invention, "C-RNTI" refers to a cell RNTI, "G-RNTI" refers to a group RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331 may be referenced.

Figure 2:
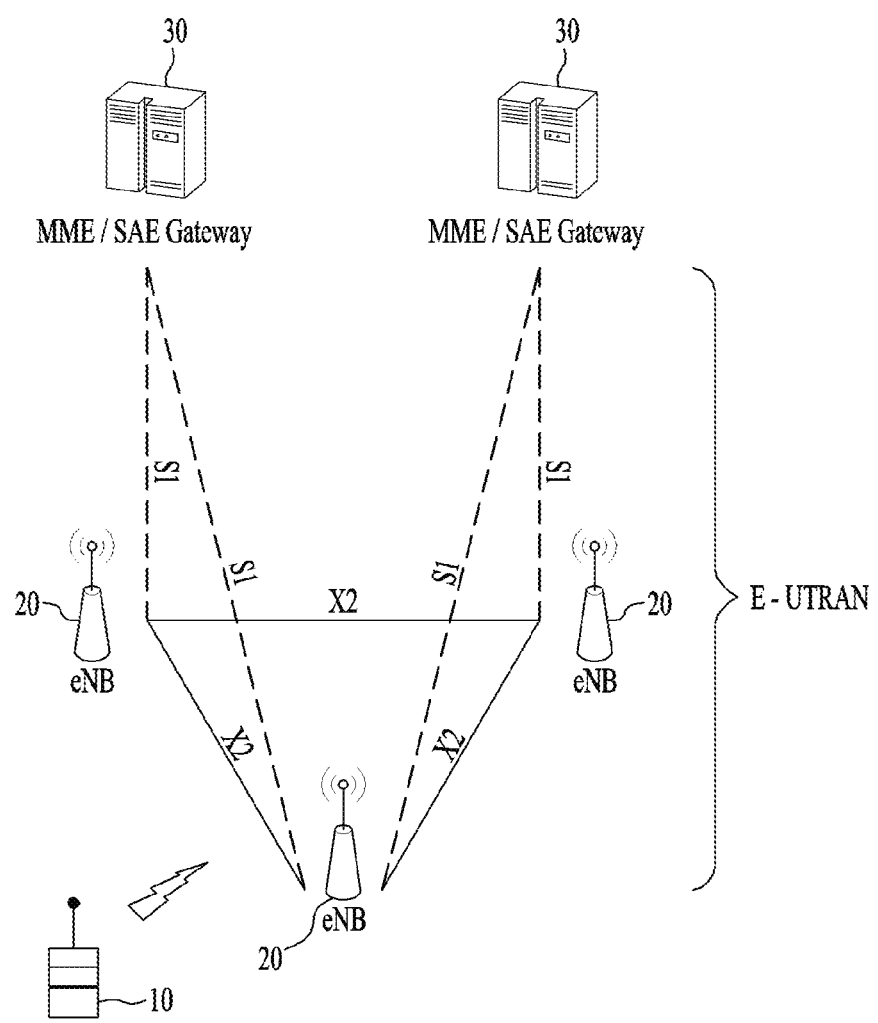
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
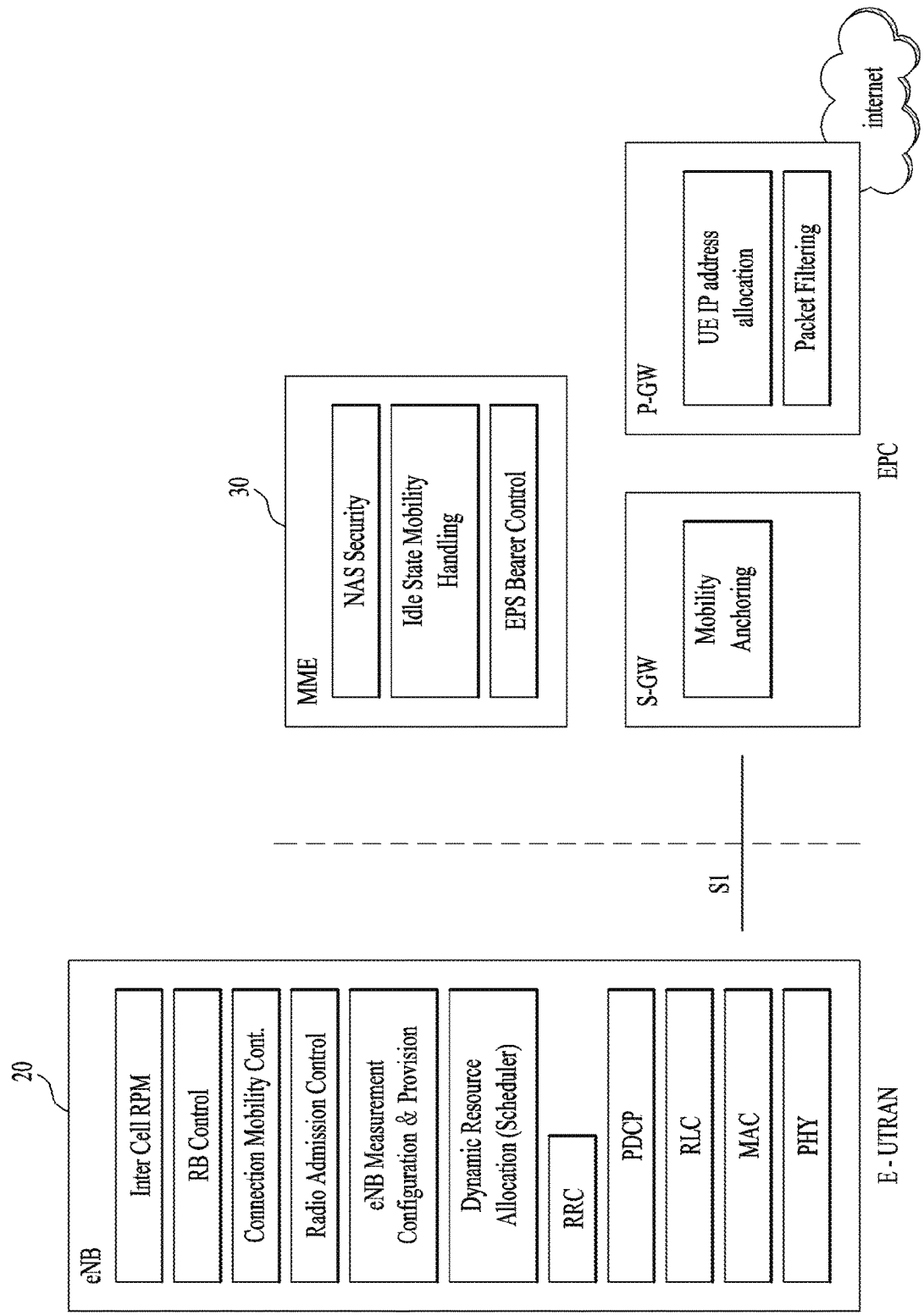
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
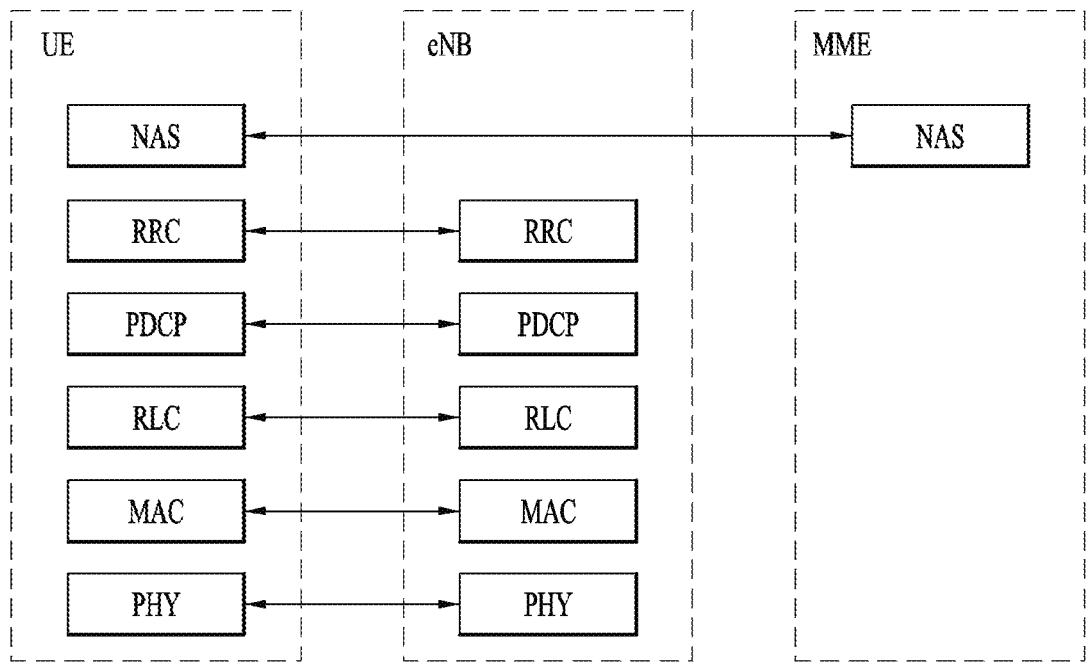
FIG. 4 is a diagram showing a control plane and a user plane of a radio interface protocol between a UE and an E-UTRAN based on a 3GPP radio access network standard.
Figure 4:
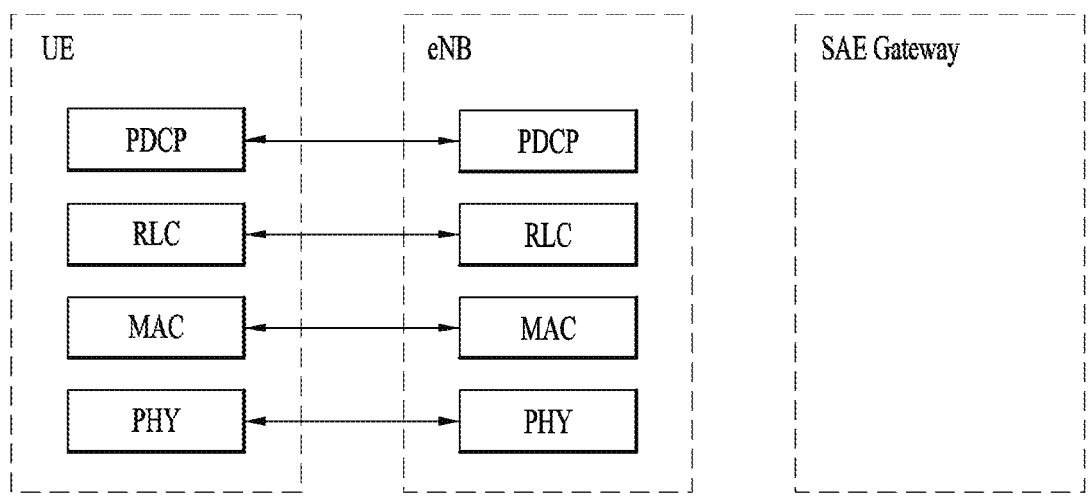

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the LTE/LTE system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the LTE/LTE system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
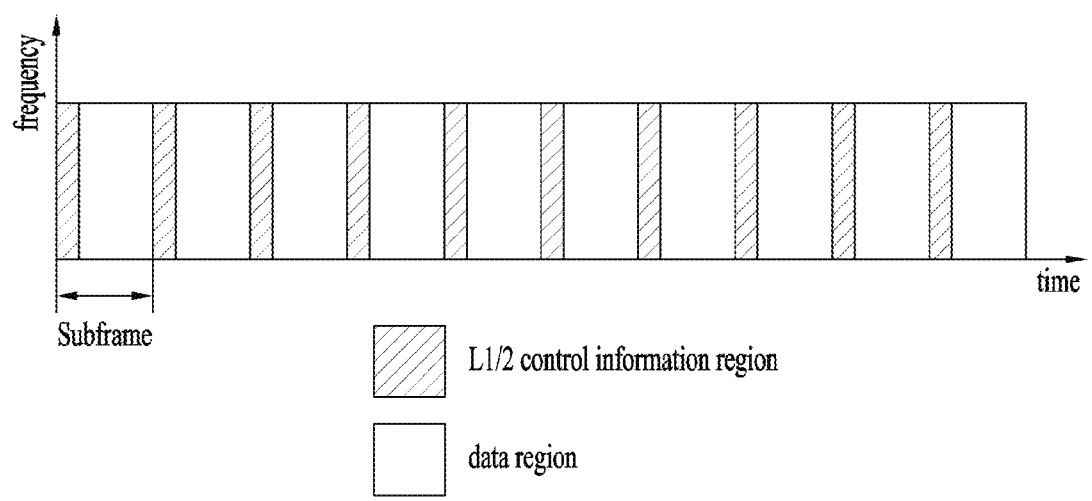
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PD-CCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

In LTE/LTE-A system, there are two types of scheduling according to scheduling interval: dynamic scheduling and semi-persistent scheduling. The dynamic scheduling by MAC schedules one TTI (1ms: one subframe), and the semi-persistent scheduling (SPS) by RRC schedules multiple TTIs.

In the case of dynamic scheduling, the UE can get scheduling assignments/grants in every subframe. This gives the network full flexibility in assigning the resources to the UE at the cost of transmission of resource allocation information on PDCCH in every subframe. This also gives the flexibility of varying the resource allocation based on the reported channel conditions. The advantage of dynamic scheduling is basically the flexibility to alter the size of data in each subframe. In downlink direction resources are assigned when data is available. For data to be sent in the uplink, the UE dynamically requests transmission opportunities whenever data arrives in the UE's uplink buffer. Information about data being sent in downlink direction and uplink transmission opportunities are carried in a PDCCH/EPDCCH/MPDCCH.

While dynamic scheduling is great for bursty, infrequent and bandwidth consuming data transmissions (e.g. web surfing, video streaming, emails) it is less suited for real time streaming applications such as voice calls. For services such as VoIP, the packet size is small and the inter-arrival time of VoIP packets is constant (i.e., adaptive multi-rate (AMR) codec provides one packet every 20 ms during active period and one silence indicator (SID) at 160 ms). The control signaling overhead (PDCCH) is too much for the E-UTRAN in order to support a large number of VoIP users. The solution for this is semi-persistent scheduling (SPS). Instead of scheduling each uplink or downlink transmission, a transmission pattern is defined instead of single opportunities. In other words, the SPS is to allocate the resources at once and let the UE use these resources instead of allocating the resources dynamically. This significantly reduces the scheduling assignment overhead. The eNB can configure the UE with SPS at any time but, typically this is done at the time of dedicated bearer establishment for the VoIP service. SPS can be configured/re-configured by RRC at any time using SPS-Config. The information element (IE) SPS-Config is used by RRC to specify the semi-persistent scheduling configuration. The SPS-Config can include the configuration for semiPersistSchedC-RNTI, sps-ConfigDL and sps-ConfigUL. When Semi-Persistent Scheduling is enabled using SPS-Config by RRC, the following information is provided:

Semi-Persistent Scheduling C-RNTI;

Uplink Semi-Persistent Scheduling interval semiPersistSchedIntervalUL and number of empty transmissions before implicit release implicitReleaseAfter, if Semi-Persistent Scheduling is enabled for the uplink;

Whether twoIntervalsConfig is enabled or disabled for uplink, only for TDD; and/or Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink.

The following table shows configuration information included in the IE SPS-Config (see 3GPP 36.331).

TABLE 1

SPS-Config field descriptions implicitReleaseAfter: Number of empty transmissions before implicit release. Value e2 corresponds to 2 transmissions, e3 corresponds to 3 transmissions and so on.
n1PUCCH-AN-PersistentList, n1PUCCH-AN-PersistentListP1: List of parameter-$n^{(1,p)}{}_{PUCCH}$ for antenna port P0 and for antenna port P1 respectively. Field n1-PUCCH-AN-PersistentListP1 is applicable only if the twoAntennaPortActivatedPUCCH-Format 1a1b in PUCCH-ConfigDedicated-v1020 is set to true. Otherwise the field is not configured.
numberOfConfSPS-Processes: The number of configured HARQ processes for downlink Semi-Persistent Scheduling.
numberOfConfUlSPS-Processes: The number of configured HARQ processes for uplink Semi-Persistent Scheduling. E-UTRAN always configures this field for asynchronous UL HARQ. Otherwise it does not configure this field.
p0-NominalPUSCH-Persistent: Parameter $P_{O\_NOMINAL\_PUSCH}(0)$. See 3GPP TS 36.213, unit dBm step 1. This field is applicable for persistent scheduling, only. If choice setup is used and p0-Persistent is absent, apply the value of p0-NominalPUSCH for p0-NominalPUSCH-Persistent. If uplink power control subframe sets are configured by lpc-SubframeSet, this field applies for uplink power control subframe set 1.
p0-NominalPUSCH-PersistentSubframeSet2: Parameter $P_{O\_NOMINAL\_PUSCH}(0)$. See 3GPP TS 36.213, unit dBm step 1. This field is applicable for persistent scheduling, only. If p0-PersistentSubframeSet2-r12 is not configured, apply the value of p0-NominalPUSCH-SubframeSet2-r12 for p0-NominalPUSCH-PersistentSubframeSet2. E-UTRAN configures this field only if uplink power control subframe sets are configured by tpc-SubframeSet, in which case this field applies for uplink power control subframe set 2.
p0-UE-PUSCH-Persistent: Parameter $P_{O\_UE\_PUSCH}(0)$. See 3GPP TS 36.213, unit dB, This field is applicable for persistent scheduling, only. If choice setup is used and p0-Persistent is absent, apply the value of p0-UE-PUSCH-Persistent for p0-UE-PUSCH-Persistent. If uplink power control subframe sets are configured by tpc-SubframeSet, this field applies for uplink power control subframe set 1.
p0-UE-PUSCH-PersistentSubframeSet2: Parameter $P_{O\_UE\_PUSCH}(0)$. See 3GPP TS 36.213, unit dB This field is applicable for persistent scheduling. only. If p0-PersistentSubframeSet2-r12 is not configured, apply the value of p0-UE-PUSCH-SubframeSet2 for p0-UE-PUSCH-PersistentSubframeSet2. E-UTRAN configures this field only if uplink power control subframe sets are configured by tpc-SubframeSet, in which case this field applies for uplink power control subframe set 2.
semiPersistSchedC-RNTI: Semi-persistent Scheduling C-RNTI, see 3GPP TS 36.321.
semiPersistSchedIntervalDL: Semi-persistent scheduling interval in downlink, see 3GPP TS 36.321 Value in number of subframes. Value sf10 corresponds to 10 subframes, sf20 corresponds to 20 subframes and so on. For TDD, the UE shall round this parameter down to the nearest integer (of 10 subframes), e.g. sf10 corresponds to 10 subframes, sf32 corresponds to 30 subframes, sf128 corresponds to 120 subframes.
semiPersistSchedIntervalUL: Semi-persistent scheduling interval in uplink, see 3GPP TS 36.321 Value in number of subframes. Value sf10 corresponds to 10 subframes, sf20 corresponds to 20 subframes and so on, For TDD, the UE shall round this parameter down to the nearest integer (of 10 subframes). e.g. sf10 corresponds to 10 subframes, sf32 corresponds to 30 subframes, sf128 corresponds to 120 subframes.
twoIntervalsConfig: Trigger of two-intervals-Semi-Persistent Scheduling in uplink. See 3GPP TS 36.321. If this field is present, two-intervals-SPS is enabled for uplink. Otherwise, two-intervals-SPS is disabled.

SPS can be configured only in the uplink (sps-ConfigUL), or in the downlink (sps-ConfigDL) or in both directions. After a Semi-Persistent downlink assignment is configured, the MAC entity considers sequentially that the $N^{th}$ assignment occurs in the subframe for which: (10*SFN+subframe)= [(10*$SFN_{start\ time}$+$subframe_{start\ time}$)+ N*semiPersistSchedIntervalDL] modulo 10240, where $SFN_{start\ time}$ and $subframe_{start\ time}$ are the SFN and subframe, respectively, at the time the configured downlink assignment were (re-)initialised (i.e., (re-)activated). For BL UEs or UEs in enhanced coverage $SFN_{start\ time}$ and $subframe_{start\ time}$ refer to SFN and subframe of the first transmission of PDSCH where configured downlink assignment was (re-)initialized. After a Semi-Persistent Scheduling uplink grant is configured, the MAC entity shall:
> if twoIntervalsConfig is enabled by upper layer:
>> set the Subframe_Offset according to Table 2 which presents Subframe_Offset values.
> else:
>> set Subframe_Offset to 0.
> consider sequentially that the $N^{th}$ grant occurs in the subframe for which: (10*SFN+subframe)=[(10* $SFN_{start\ time}$+$subframe_{start\ time}$)+ N*semiPersistSchedIntervalUL+Subframe_Offset*(N modulo 2)] modulo 10240, where $SFN_{start\ time}$ and $subframe_{start\ time}$ are the SFN and subframe, respectively, at the time the configured uplink grant were (re-)initialised.

TABLE 2

| TDD UL/DL configuration | Position of initial Semi-Persistent grant | Subframe_Offset value (ms) |
|---|---|---|
| 0 | N/A | 0 |
| 1 | Subframes 2 and 7 | 1 |
|   | Subframes 3 and 8 | −1 |
| 2 | Subframe 2 | 5 |
|   | Subframe 7 | −5 |
| 3 | Subframes 2 and 3 | 1 |
|   | Subframe 4 | −2 |
| 4 | Subframe 2 | 1 |
|   | Subframe 3 | −1 |
| 5 | N/A | 0 |
| 6 | N/A | 0 |

The MAC entity clears the configured uplink grant immediately after implicitReleaseAfter number of consecutive new MAC PDUs each containing zero MAC SDUs have been provided by the Multiplexing and Assembly entity, on the Semi-Persistent Scheduling resource.

Retransmissions for Semi-Persistent Scheduling can continue after clearing the configured uplink grant.

For BL UEs or UEs in enhanced coverage $SFN_{start\ time}$ and $subframe_{start\ time}$ refer to SFN and subframe of the first transmission of PUSCH where configured uplink grant was (re-) initialized.

Configuration of SPS doesn't mean that the UE can start using SPS grants/assignments. The eNB has to explicitly activate SPS as explained below, in order for the UE to use SPS grants/assignments. So, SPS configuration and activation are two different things, eNB first configures the UE with SPS and then activates the same. The eNB can explicitly release SPS without release SPS RRC configuration. When configuring SPS in any direction either UL or DL, SPS C-RNTI is mandatorily provided by the eNB. Soon after the UE is configured with SPS C-RNTI, the UE is configured by higher layers to decode PDCCH with CRC scrambled by the SPS C-RNTI. A UE shall monitor PDCCH with CRC scrambled by the SPS C-RNTI in every subframe as the eNB can activate/re-activate/release SPS at any time using Downlink control information (DCI). In the current LTE/LTE-A system, DCI format 0 is used to activate/release SPS in UL, and DCI format 1/1A/2/2A/2B/2C is used to activate SPS in DL. The received DCI format on SPS C-RNTI can be a grant/assignment for a retransmission or for activation/re-activation/release of SPS. 3GPP TS 36.213 has tabulated the validation procedure for activation/re-activation/release of SPS. A UE shall validate an SPS assignment PDCCH only if all the following conditions are met:

the CRC parity bits obtained for the PDCCH payload are scrambled with the SPS C-RNTI, and the new data indicator (NDI) field is set to '0'. In case of DCI formats 2, 2A, 2B, 2C and 2D, the NDI field refers to the one for the enabled transport block.

A UE shall validate an SPS assignment EPDCCH only if all the following conditions are met:

the CRC parity bits obtained for the EPDCCH payload are scrambled with the SPS C-RNTI, and the NDI field is set to '0'. In case of DCI formats 2, 2A, 2B, 2C and 2D, the NDI field refers to the one for the enabled transport block.

A UE shall validate an SPS MPDCCH only if all the following conditions are met:

the CRC parity bits obtained for the MPDCCH payload are scrambled with the SPS C-RNTI the NDI field is set to '0'.

Validation is achieved if all the fields for the respective used DCI format are set according to Table 3, Table 4, Table 5 or Table 6. Table 3 shows special fields for SPS activation PDCCH/EPDCCH validation, Table 4 shows special fields for SPS release PDCCH/EPDCCH validation, Table 5 shows special fields for SPS activation MPDCCH validation, and Table 6 show special fields for SPS release MPDCCH validation.

TABLE 3

| | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

TABLE 4

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

TABLE 5

| | DCI format 6-0A | DCI format 6-1A |
|---|---|---|
| HARQ process number | set to '000' | FDD: set to '000' TDD: set to '0000' |
| Redundancy version | set to '00' | set to '00' |
| TPC command for scheduled PUSCH | set to '00' | N/A |
| TPC command for scheduled PUCCH | N/A | set to '00' |

TABLE 6

| | DCI format 6-0A | DCI format 6-1A |
|---|---|---|
| HARQ process number | set to '000' | FDD: set to '000' TDD: set to '0000' |
| Redundancy version | set to '00' | set to '00' |
| Repetition number | set to '00' | set to '00' |
| Modulation and coding scheme | set to '1111' | set to '1111' |
| TPC command for scheduled PUSCH | set to '00' | N/A |
| Resource block assignment | Set to all '1's | Set to all '1's |

If validation is achieved, the UE shall consider the received DCI information accordingly as a valid SPS activation or release. If validation is not achieved, the received DCI format shall be considered by the UE as having been received with a non-matching CRC For the case that the DCI format indicates a semi-persistent downlink scheduling activation, the TPC command for PUCCH field shall be used as an index to one of the four PUCCH resource values configured by higher layers (e.g., RRC), with the mapping defined in Table 7.

TABLE 7

| Value of 'TPC command for PUCCH' | $n^{(1,p)}_{PUCCH}$ |
|---|---|
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

In summary, with semi-persistent scheduling, a UE is provided with the scheduling decision on the PDCCH (PDCCH/EPDDCH/MPDCCH validation for SPS), together with an indication that this (SPS-Config) applies to every n-th subfame (semiPersistSchedIntervalUL, semiPersistSchedIntervalDL) until further notice. Hence, control signaling (SPS-Config) is only used once and the overhead is reduced. The periodicity of semi-persistently scheduled transmissions, that is, the value of n (semiPersistSchedIntervalUL, semiPersistSchedIntervalDL) is configured by RRC signaling in advance, while activation (and deactivation) is done using the PDCCH/EPDCCH/MPDCCH. For example, for VoIP an eNB can configure a periodicity of 20 ms for semi-persistent scheduling and once a talk spurt starts, the semi-persistent pattern is triggered by the PDCCH/EPDCCH/MPDCCH.

For downlink, only initial transmissions use semi-persistent scheduling. Retransmissions are explicitley scheduled using a PDCCH assignment. This follows directfy from the use of asynchronous HARQ protocol in the downlink. Uplink retransmission, in contrast, can either follow the semi-persistently allocated subframs or be dynmically scheduled.

When semi-persistent scheduling for uplink or downlink is disabled by RRC, the corresponding configured grant or configured assignment shall be discarded. In the legacy LTE/LTE-A system, semi-persistent scheduling is supported on the SpCell only.

Downlink assignments transmitted on the PDCCH indicate if there is a transmission on a DL-SCH for a particular MAC entity and provide the relevant HARQ information. When the MAC entity has a C-RNTI, Semi-Persistent Scheduling C-RNTI, or Temporary C-RNTI, the MAC entity shall for each TTI during which it monitors PDCCH and for each Serving Cell:

> if a downlink assignment for this TTI and this Serving Cell has been received on the PDCCH for the MAC entity's C-RNTI, or Temporary C-RNTI:
>> if this is the first downlink assignment for this Temporary C-RNTI:
>>> consider the new data indicator (NDI) to have been toggled.
>> if the downlink assignment is for the MAC entity's C-RNTI and if the previous downlink assignment indicated to the HARQ entity of the same HARQ process was either a downlink assignment received for the MAC entity's Semi-Persistent Scheduling C-RNTI or a configured downlink assignment:
>>> consider the NDI to have been toggled regardless of the value of the NDI.
>> indicate the presence of a downlink assignment and deliver the associated HARQ information to the HARQ entity for this TTI.
> else, if this Serving Cell is the SpCell and a downlink assignment for this TTI has been received for the SpCell on the PDCCH of the SpCell for the MAC entity's Semi-Persistent Scheduling C-RNTI:
>> if the NDI in the received HARQ information is 1:
>>> consider the NDI not to have been toggled;
>>> indicate the presence of a downlink assignment and deliver the associated HARQ information to the HARQ entity for this TTI.
>> else, if the NDI in the received HARQ information is 0:
>>> if PDCCH contents indicate SPS release:
>>>> clear the configured downlink assignment (if any);
>>>> if the timeAlignmentTimer associated with the pTAG is running:
>>>>> indicate a positive acknowledgement for the downlink SPS release to the physical layer.
>>> else:
>>>> store the downlink assignment and the associated HARQ information as configured downlink assignment;
>>>> initialise (if not active) or re-initialise (if already active) the configured downlink assignment to start in this TTI and to recur according to rules of downlink semi-persistent schedule;
>>>> set the HARQ Process ID to the HARQ Process ID associated with this TTI;
>>>> consider the NDI bit to have been toggled;
>>>> indicate the presence of a configured downlink assignment and deliver the stored HARQ information to the HARQ entity for this TTI.
> else, if this Serving Cell is the SpCell and a downlink assignment for this TTI has been configured for the SpCell and there is no measurement gap in this TTI and there is no Sidelink Discovery Gap for Reception in this TTI; and
> if this TTI is not an MBSFN subframe of the SpCell or the MAC entity is configured with transmission mode tm9 or tm10 on the SpCell:
>> instruct the physical layer to receive, in this TTI, transport block on the DL-SCH according to the configured downlink assignment and to deliver it to the HARQ entity;
>> set the HARQ Process ID to the HARQ Process ID associated with this TTI;
>> consider the NDI bit to have been toggled;
>> indicate the presence of a configured downlink assignment and deliver the stored HARQ information to the HARQ entity for this TTI.

For configured downlink assignments, the HARQ Process ID associated with this TTI is derived from the following equation: HARQ Process ID [floor(CURRENT_TTI/semiPersistSchedIntervalDL)] modulo numberOfConfSPS-Processes, where CURRENT_TTI=[(SFN*10)+subframe number].

For BL UEs or UEs in enhanced coverage, CURRENT_TTI refers to the TTI where first transmission of repetition bundle takes place.

When the MAC entity needs to read BCCH, the MAC entity may, based on the scheduling information from RRC:
> if the UE is a bandwidth limited (BL) UE or a UE in enhanced coverage:

>> the redundancy version of the received downlink assignment for this TTI is determined by $RV_K$=ceiling(3/2*k) modulo 4, where k depends on the type of system information message.

>>> for SystemInformationBlockType1-BR

>>>> if number of repetitions for PDSCH carrying SystemInformationBlockType1-BR is 4, k=floor(SFN/2) modulo 4, where SFN is the system frame number.

>>>> else if number of repetitions for PDSCH carrying SystemInformationBlockType1-BR is 8, k=SFN modulo 4, where SFN is the system frame number.

>>>> else if number of repetitions for PDSCH carrying SystemInformationBlockType1-BR is 16, k=(SFN*10+i) modulo 4, where SFN is the system frame number, and i denotes the subframe within the SFN.

>>> for Systeminformation messages, k=i modulo 4, i=0,1, . . . , $n_s^w$−1, where i denotes the subframe number within the SI window $n_s^w$;

>> indicate a downlink assignment and redundancy version for the dedicated broadcast HARQ process to the HARQ entity for this TTI.

> else if a downlink assignment for this TTI has been received on the PDCCH for the SI-RNTI, except for NB-IoT;

>> if the redundancy version is not defined in the PDCCH format:

>>> the redundancy version of the received downlink assignment for this TTI is determined by $RV_K$=ceiling(3/2*k) modulo 4, where k depends on the type of system information message: for SystemInformationBlockType1 message, k=(SFN/2) modulo 4, where SFN is the system frame number; for Systeminformation messages, k=i modulo 4, i $n_s^w$−1, where i denotes the subframe number within the SI window $n_s^w$;

>> indicate a downlink assignment and redundancy version for the dedicated broadcast HARQ process to the HARQ entity for this TTI.

When the MAC entity has SC-RNTI and/or G-RNTI, the MAC entity shall for each TTI during which it monitors PDCCH for SC-RNTI and for G-RNTI and for each Serving Cell:

> if a downlink assignment for this TTI and this Serving Cell has been received on the PDCCH for the MAC entity's SC-RNTI or G-RNTI:

>> attempt to decode the received data.

> if the data which the MAC entity attempted to decode was successfully decoded for this TB:

>> deliver the decoded MAC PDU to the disassembly and demultiplexing entity.

In order to transmit on the UL-SCH the MAC entity must have a valid uplink grant (except for non-adaptive HARQ retransmissions) which it may receive dynamically on the PDCCH or in a random access response (RAR) or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

If the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI:

> if an uplink grant for this TTI and this Serving Cell has been received on the PDCCH for the MAC entity's C-RNTI or Temporary C-RNTI; or > if an uplink grant for this TTI has been received in a Random Access Response:

>> if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant:

>>> consider the NDI to have been toggled for the corresponding HARQ process regardless of the value of the NDI.

>> deliver the uplink grant and the associated HARQ information to the HARQ entity for this TTI.

> else, if this Serving Cell is the SpCell and if an uplink grant for this TTI has been received for the SpCell on the PDCCH of the SpCell for the MAC entity's Semi-Persistent Scheduling C-RNTI:

>> if the NDI in the received HARQ information is 1:

>>> consider the NDI for the corresponding HARQ process not to have been toggled;

>>> deliver the uplink grant and the associated HARQ information to the HARQ entity for this TTI.

>> else if the NDI in the received HARQ information is 0:

>>> if PDCCH contents indicate SPS release:

>>>> clear the configured uplink grant (if any).

>>> else:

>>>> store the uplink grant and the associated HARQ information as configured uplink grant;

>>>> initialise (if not active) or re-initialise (if already active) the configured uplink grant to start in this TTI and to recur according to rules of uplink semi-persistent scheduling;

>>>> if UL HARQ operation is asynchronous, set the HARQ Process ID to the HARQ Process ID associated with this TTI;

>>>> consider the NDI bit for the corresponding HARQ process to have been toggled;

>>>> deliver the configured uplink grant and the associated HARQ information to the HARQ entity for this TTI.

> else, if this Serving Cell is the SpCell and an uplink grant for this TTI has been configured for the SpCell:

>> if UL HARQ operation is asynchronous, set the HARQ Process ID to the HARQ Process ID associated with this TTI;

>> consider the NDI bit for the corresponding HARQ process to have been toggled;

>> deliver the configured uplink grant, and the associated HARQ information to the HARQ entity for this TTI.

In the above description, the period of configured uplink grants is expressed in TTIs.

For configured uplink grants, the HARQ Process ID associated with this TTI is derived from the following equation for asynchronous UL HARQ operation: HARQ Process ID=[floor(CURRENT_TTI/semiPersistSchedIntervalUL)] modulo numberOfConfUlSPS-Processes, where CURRENT_TTI=[(SFN*10)+subframe number] and it refers to the subframe where the first transmission of a bundle takes place.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Work has started in ITU and 3GPP to develop requirements and specifications for new radio (NR) systems, as in the Recommendation ITU-R M.2083 "Framework and overall objectives of the future development of IMT for 2020 and beyond", as well as 3GPP SA1 study item New Services and Markets Technology Enablers (SMARTER) and SA2 study item Architecture for NR System. It is required to identify and develop the technology components needed for successfully standardizing the NR system timely satisfying both the urgent market needs, and the more long-term requirements set forth by the ITU-R IMT-2020 process. In order to achieve this, evolutions of the radio interface as well as radio network architecture have to be considered in the "New Radio Access Technology."

In the legacy LTE/LTE-A system, one SPS resource configuration (semiPersistSchedIntervalDL) for DL and one SPS resource configuration (semiPersistSchedIntervalUL) for UL is configured. In other words, in the prior art, one SPS (time resource) pattern is configured per DL and per UL. After receiving SPS configuration information, the UE receives a PDCCH activating/initializing SPS resource, and then receives a PDCCH releasing SPS resources. For the latency reduction, a new feedback mechanism is introduced, i.e., SPS confirmation MAC CE. As only one SPS pattern (i.e. SPS resource configuration) for each of DL and UL are configured and used at the UE in the legacy LTE/LTE-A system, the SPS confirmation MAC CE does not consider the SPS pattern itself but only acknowledges whether the UE receives the PDCCH command successfully or not.

Recently, 3GPP is considering introducing multiple SPS patterns for supporting other types of traffics as well as the 20 ms VoIP. If multiple SPS patterns are introduced, one or more SPS patterns are provided to the UE and can be configured and activated at the same time. However, with the current SPS activation/release mechanism, all SPS resources are activated/initialized at the same time and released at the same time. In addition, SPS feedback cannot tell which SPS pattern is activated or released.

In supporting multiple types of traffics, it would be necessary to activate/release an SPS pattern independently so that the network is able to adjust overall SPS patterns dynamically depending on the on-going traffic. Accordingly, SPS feedback would need to tell which SPS pattern is activated or released by taking multiple SPS patterns into account.

<A. SPS Command for Multiple SPS Patterns>

In the present invention, it is assumed that:

'an SPS pattern is activated' means that SPS resources are activated/initialized on the subframes according to the SPS pattern and the UE transfers data by using the SPS resources of the SPS pattern;

'an SPS pattern is released' means that SPS resources according to the SPS pattern is released/deactivated and the UE doesn't transfer data by using the SPS resources of the SPS pattern.

Figure 6:
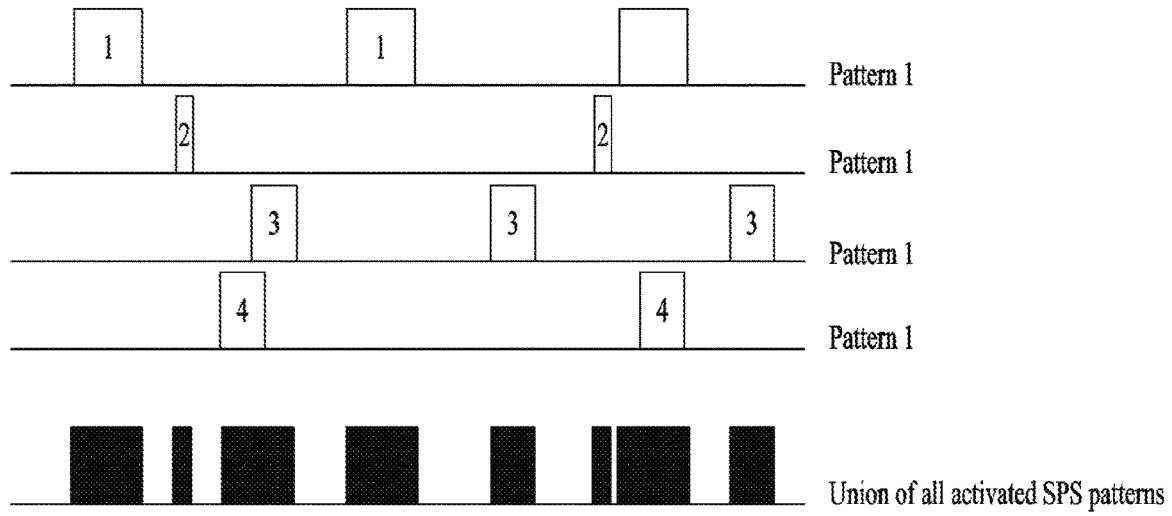
FIG. 6 shows an example of multiple semi-persistent (SPS) patterns configured in a user equipment.

FIG. 6 shows an example of multiple semi-persistent (SPS) patterns configured in a user equipment.

In the present invention, the UE is configured to use multiple SPS patterns simultaneously by receiving an SPS command and considers the SPS resource as a union of all activated SPS patterns according to the SPS command.

A UE is configured with multiple SPS patterns by a network via L1, L2, or L3 (L1/L2/L3) signaling including: at least one SPS pattern indicator and/or an SPS resource information corresponding to each SPS pattern.

When the UE receives the L1/L2/L3 signaling configuring SPS patterns, the UE stores the SPS patterns but doesn't activate the SPS patterns by UE itself. The UE receives an SPS command from the network indicating whether an SPS pattern is activated or released (or not activated). When the UE receives the SPS command from the network, the UE activates/releases the SPS pattern according to the received SPS command.

The SPS command is received via L1/L2/L3 signaling including: at least one SPS pattern indicator and/or an activation or release indicator for each SPS pattern.

The SPS command includes SPS pattern indicator(s) either explicitly or implicitly. The SPS command may include a specific field as the SPS pattern indicator(s). For example, the specific field may be associated with each SPS pattern. Each bit of the SPS command may be associated with one of the SPS patterns, i.e., by using a bitmap (e.g., Table 8). For another example, the a specific field in the SPS command may include an SPS pattern indicator. 3 bits of pattern indicator may be included in the SPS command for each SPS pattern (e.g. Table 9 or Table 10).

When the UE receives the SPS command, the UE:

> activates the SPS pattern which is indicated to be activated,

> releases the SPS pattern which is indicated to be released, and/or

> considers that the SPS resources are activated on the subframes which are a union of the activated SPS patterns over all SPS patterns (as shown in FIG. 6. For example, the UE considers that an SPS resource is activated on a subframe if the SPS resource is activated by at least one activated SPS pattern among the SPS patterns configured to the UE. For another example, the UE considers that an SPS resource is not activated on a subframe if the SPS resource is not activated by any activated SPS pattern among the SPS patterns configured to the UE.

In the present invention, any one of the follow examples can be used for an SPS command for multiple SPS patterns.

Example A.1

Each field of an SPS command is associated with each of the SPS patterns and indicates Activation/Release of the associated SPS pattern. The following table shows an example of a SPS command for multiple SPS patterns according to Example A.1 of the present invention.

TABLE 8

| $P_8$ | $P_7$ | $P_6$ | $P_5$ | $P_4$ | $P_3$ | $P_2$ | $P_1$ |

Referring to Table 8, the SPS command includes Pi field, where Pi field indicates whether the SPS pattern with SPS pattern indicator i is to be Activated or to be Released. For example, Pi is set to 1 if the SPS pattern i is to be Activated, and set to 0 if the SPS pattern i is to be Released.

The SPS command may be a fixed size of signaling depending on the number of SPS patterns. For example, the SPS command may be 1 byte if the highest SPS pattern indicator is 8, 2 bytes if the highest SPS pattern indicator is 16. In this case, no length indicator may be included in the corresponding subheader. The UE can deduce or calculate the length of the SPS command from the highest SPS pattern indicator.

The SPS command may be a variable size of signaling depending on the number of SPS patterns. For example, the SPS command may be 1 byte if the highest SPS pattern indicator is 8, 2 bytes if the highest SPS pattern indicator is 16, and so on. The length indicator is included in the corresponding subheader.

The SPS command a fixed size of signaling regardless of the number of SPS patterns. For example, the SPS command may be 4 bytes irrespective of the number of SPS patterns configured at the UE.

Example A.2-1

The SPS command includes explicitly the SPS pattern indicator field and Activation/Release indicator field. The SPS command includes all SPS patterns of which state is to be changed. The following tables shows an example of an SPS command for multiple SPS patterns according to Example A.2-1 of the present invention.

TABLE 9

| Pattern i | A/R | Pattern j | A/R |
|---|---|---|---|
| Pattern k | A/R | Pattern m | A/R |

Table 9 shows an SPS command including Activation/Release indicator for an even number of SPS patterns. The following table shows an another example of an SPS command for multiple SPS patterns according to Example A.2-1 of the present invention.

TABLE 10

| Pattern i | A/R | | Pattern j | | | A/R |
|---|---|---|---|---|---|---|
| Pattern k | A/R | R | R | R | R | |

Table 10 shows an SPS command including Activation/Release indicator for an odd number of SPS patterns.

Referring to Table 9 and 10, the SPS command may include 3 bits of SPS pattern indicator field. The SPS command may include 1 bit of A/R field which indicates whether the corresponding SPS pattern is to be Activated or to be Released. For example, the A/R field is set to 1 if the corresponding SPS pattern is to be Activated, and set to 0 if the corresponding SPS pattern is to be Released.

The SPS command can be a variable size of signaling. The SPS command may include only the SPS patterns that is to be Activated or Released. In other words, the SPS command may not include the SPS pattern of which state is not to be changed. If the SPS command includes Activation/Release indicator for an odd number of SPS patterns, the SPS command may include R fields to make the SPS command byte aligned. The length of the SPS command may indicated in the corresponding subheader. One field, e.g., extension field, of the corresponding subheader may indicate whether odd number of even number of SPS patterns are included in the SPS command.

Example A.2-2

The SPS command includes explicitly the SPS pattern indicator field and Activation/Release indicator field. The SPS command includes only one SPS pattern of which state is to be changed. The following table shows an example of an SPS command for multiple SPS patterns according to Example A.2-2 of the present invention.

TABLE 11

| Pattern i | A/R | R | R | R | R |
|---|---|---|---|---|---|

Referring to Table 11, the SPS command may include 3 bits of SPS pattern indicator field. The SPS command may include 1 bit of A/R field which indicates whether the corresponding SPS pattern i is to be Activated or to be Released. For example, the A/R field is set to 1 if the corresponding SPS pattern is to be Activated, and set to 0 if the corresponding SPS pattern is to be Released. The SPS command may be a fixed size of signaling. The SPS command includes only one SPS pattern that is to be Activated or Released. For example, the length of the SPS command is fixed to one byte.

<B. SPS Feedback for Multiple SPS Patterns>

In response to the SPS command, the UE generates an SPS feedback indicating whether an SPS pattern is activated or released (i.e., not activated) according to the latest SPS command.

The SPS feedback may include an SPS pattern indicator either explicitly or implicitly, and/or an SPS pattern Activation/Release indicator. The SPS feedback may include a specific field as the SPS pattern indicator. For example, each bit of the specific field in the SPS feedback may be associated with one of the SPS patterns, i.e., by using a bitmap (e.g., Table 12). The specific field in the SPS feedback may include an SPS pattern indicator for each SPS pattern. For example, 3 bits of pattern indicator may be included in the SPS feedback for each SPS pattern. The SPS pattern Activation/Release indicator indicates whether the corresponding SPS pattern is activated or released (i.e., not activated).

The UE transmits the generated SPS feedback to the network.

The UE determines when to transmit the SPS feedback as follows (i.e., the UE transmits the SPS feedback through the following SPS resource or subframe):

> on the first SPS resource among the union of all activated SPS patterns after the UE receives the SPS command; or > on the first SPS resource among the union of all activated SPS patterns after the UE activates the SPS resource according to the received SPS command; or > on the first SPS resource among the union of all activated SPS patterns after the UE generates the SPS feedback; or > on the first uplink resource, either dynamic UL grant or SPS resource, after the UE receives the SPS command; or > on the first uplink resource, either dynamic UL grant or SPS resource, after the UE receives the SPS command after the UE activates the SPS resource according to the received SPS command; or > on the first uplink resource, either dynamic UL grant or SPS resource, after the UE generates the SPS feedback; or > in the subframe which is N subframes, TTIs, or miliseconds after the UE receives the SPS command.

When the UE determines when to transmit the SPS feedback, the activated SPS patterns may refer to the SPS pattern which is newly activated pattern by the received SPS command, and/or the SPS pattern which is already activated pattern before receiving the SPS command. In the latter case, the SPS pattern, which was activated before the received SPS command and is to be released by the received SPS command, may be included in the activated SPS patterns. For determining when to transmit the SPS feedback, the UE may release the SPS patterns according to the received SPS command only after transmitting the SPS feedback.

In the present invention, any one of the follow examples can be used for an SPS feedback for multiple SPS patterns.

Example B.1

Each field of SPS feedback is associated with each of the SPS patterns and indicates Activation/Release of associated SPS pattern. The following table shows an example of SPS feedback for multiple SPS patterns according to Example B.1 of the present invention.

TABLE 12

| $P_8$ | $P_7$ | $P_6$ | $P_5$ | $P_4$ | $P_3$ | $P_2$ | $P_1$ |
| --- | --- | --- | --- | --- | --- | --- | --- |

Referring to Table 12, the SPS feedback includes Pi field, where Pi field indicates whether the SPS pattern with SPS pattern indicator i is to be Activated or to be Released. For example, Pi is set to 1 if the SPS pattern i is Activated, and set to 0 if the SPS pattern i is Released or not yet Activated. The SPS feedback may be a variable size of signaling depending on the number of SPS patterns. For example, the SPS feedback may be 1 byte if the highest SPS pattern indicator is 8, 2 bytes if the highest SPS pattern indicator is 16. The SPS feedback may be a fixed size of signaling based on the maximum number of SPS patterns, i.e., regardless of the number of SPS patterns. For example, the SPS feedback may be 4 bytes irrespective of the number of SPS patterns configured at the UE.

Example B.2-1

The SPS feedback includes explicitly the SPS pattern indicator field and Activation/Release indicator field. The SPS feedback includes only the SPS patterns that is Activated or Released according to the latest SPS command. The following table shows an example of an SPS feedback for multiple SPS patterns according to Example B.2-1 of the present invention.

TABLE 13

| Pattern i | A/R | Pattern j | A/R |
| --- | --- | --- | --- |
| Pattern k | A/R | Pattern m | A/R |

Table 13 shows an SPS feedback including Activation/Release indicator for even number of SPS patterns. The following table shows another example of an SPS feedback for multiple SPS patterns according to Example B.2-1 of the present invention.

TABLE 14

| Pattern i | A/R | | Pattern j | | A/R |
| --- | --- | --- | --- | --- | --- |
| Pattern k | A/R | R | R | R | R |

Table 14 shows an SPS feedback including Activation/Release indicator for odd number of SPS patterns.

Referring to Table 13 or Table 14, the SPS feedback may include 3 bits of SPS pattern indicator field. The SPS feedback may include 1 bit of A/R field which indicates whether the corresponding SPS pattern is Activated or Released. For example, the A/R field is set to 1 if the corresponding SPS pattern is Activated, and set to 0 if the corresponding SPS pattern is Released.

The SPS feedback can be a variable size of signaling. The SPS feedback may include only the SPS patterns that is Activated or Released according to the latest SPS command. The length of the SPS feedback may be indicated in the corresponding subheader. If the SPS feedback includes Activation/Release indicator for odd number of SPS patterns, the SPS command may include R fields to make the SPS command byte aligned.

Example B.2-2

The SPS feedback includes explicitly the SPS pattern indicator field and Activation/Release indicator field. The SPS feedback includes all SPS patterns that is configured to the UE. The following table shows an example of an SPS feedback for multiple SPS patterns according to Example B.2-2 of the present invention.

TABLE 15

| Pattern 1 | A/R | Pattern 2 | A/R |
| --- | --- | --- | --- |
| Pattern 3 | A/R | Pattern 4 | A/R |
| Pattern 5 | A/R | Pattern 6 | A/R |
| Pattern 7 | A/R | Pattern 8 | A/R |

Referring to Table 15, the SPS feedback may include 3 bits of SPS pattern indicator field. The SPS feedback may include 1 bit of A/R field which indicates whether the corresponding SPS pattern is Activated or Released in the UE side. For example, the A/R field is set to 1 if the corresponding SPS pattern is Activated, and set to 0 if the corresponding SPS pattern is Released or not yet Activated. The SPS feedback can be fixed size of signaling. The SPS feedback includes all SPS patterns that is configured to the UE. In other words, the SPS feedback also includes the SPS pattern of which state is not changed according to the latest SPS command.

The present invention described in the section A and the present invention described in the section B can be used together or independently.

Figure 7:
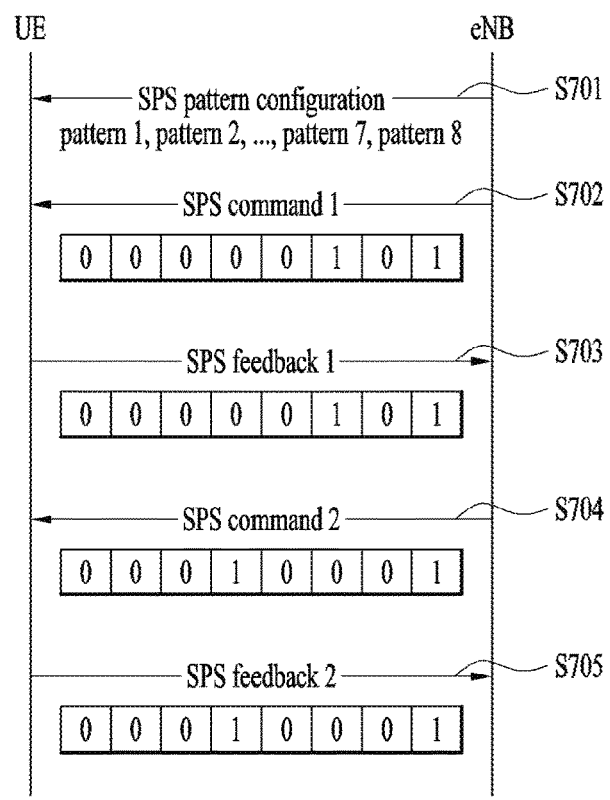
FIG. 7 illustrates an example of using an SPS command and an SPS feedback according to the present invention.

FIG. 7 illustrates an example of using an SPS command and an SPS feedback according to the present invention. Especially, FIG. 7 shows an example of the present invention, referring to Table 8 and Table 12.

> S701. The UE is configured with SPS Patterns 1,2, . . . , 7,8.

> S702. The UE receives an SPS command 1, which activates SPS pattern 1 and 3.

> S703. The UE generates an SPS feedback indicating SPS pattern 1 and 3 are activated and other SPS patterns are not activated, i.e., released. The UE transmits the generated SPS feedback 1. For example, the UE transmits the SPS feedback 1 on the first SPS resource of the union of SPS pattern 1 and 3.

> S704. The UE receives an SPS command 2, which activates SPS pattern 5 and releases SPS pattern 3.

> S705. The UE generates an SPS feedback indicating SPS pattern 1 and 5 are activated and other SPS patterns are not activated, i.e., released. For example, the UE transmits the SPS feedback 2 on the first SPS resource of the union of SPS pattern 1, 3, and 5. The UE transmits the generated SPS feedback 2. The UE releases the SPS pattern 3.

Figure 8:
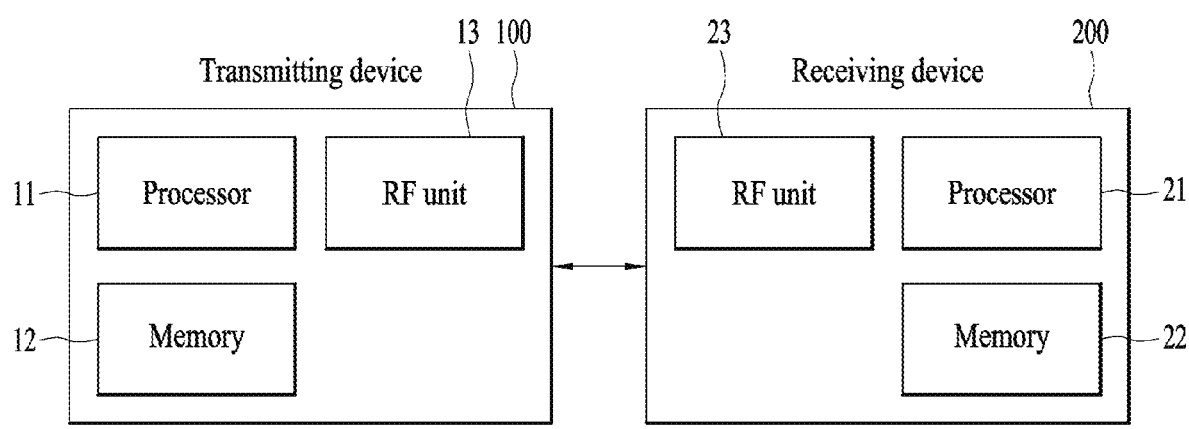
FIG. 8 is a block diagram illustrating elements of a transmitting device 100 and a receiving device 200 for implementing the present invention.

FIG. 8 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor is configured to control the eNB RF unit to transmit SPS configuration information on N SPS resource configurations (i.e. N SPS patterns) according to the present invention, where N is an integer larger than 1. The UE processor is configured to control the UE RF unit to receive the SPS configuration information. The eNB processor is configured to control the eNB RF unit to transmit an SPS command to activate or deactivate each of multiple SPS resource configurations among the N SPS resource configurations. The UE processor is configured to control the UE RF unit to receive the SPS command. The SPS command includes information indicating each of the multiple SPS resource configurations and information indicating whether a corresponding SPS resource configuration is activated or deactivated. The UE processor may be configured to activate or deactivate SPS resource configuration(s) among the N SPS resource configurations based on the SPS command. The UE processor is configured to control the UE RF unit to perform downlink reception in a DL SPS resource corresponding to a DL SPS resource configuration among activated DL SPS resource configurations, or configured to control the UE RF unit to perform uplink transmission in a UL SPS resource corresponding to a UL SPS resource configuration among activated UL SPS resource configurations. The eNB processor is configured to control the eNB RF unit to perform downlink transmission in a DL SPS resource corresponding to a DL SPS resource configuration among activated DL SPS resource configurations, or configured to control the eNB RF unit to perform uplink reception in a UL SPS resource corresponding to a UL SPS resource configuration among activated UL SPS resource configurations. The SPS command may include a bitmap including N bits respectively corresponding to the N SPS resource configurations, wherein each bit of the N bits is corresponding to an index of each of the N SPS resource configurations and indicates whether an SPS resource configuration corresponding to a bit of the N bits is activated or deactivated. The UE processor may be configured to activate an SPS resource configuration corresponding to a bit set to a first value among the N bits; and deactivate an SPS resource configuration corresponding to a bit set to a second value among the N bits. The eNB processor may assume that the UE activates an SPS resource configuration corresponding to a bit set to a first value among the N bits; and deactivates an SPS resource configuration corresponding to a bit set to a second value among the N bits. The SPS command may include an index of each of the multiple SPS resource configuration and an indicator indicating whether an SPS resource configuration corresponding to the index is activated or deactivated. The UE processor may be configured to maintain an activated or deactivated state of an SPS resource configuration not indicated by the SPS command. The eNB processor may assume that the UE maintains an activated or deactivated state of an SPS resource configuration not indicated by the SPS command. The SPS command may be received/transmitted via a medium access control (MAC) signaling. For example, the SPS command may be received/transmitted in a MAC control element (CE).

The UE processor may be configured to control the UE RF unit transmit an SPS status information (i.e. SPS feedback) indicating activation or deactivation status for each of the N SPS resource configurations according to the present invention. The eNB processor is configured to control the eNB RF unit to receive the SPS status information according to the present invention. The SPS status information may include a bitmap including N bits respectively corresponding to the N SPS resource configurations, wherein each bit of the N bits is corresponding to an index of each of the N SPS resource configurations and indicates whether an SPS resource configuration corresponding to a bit of the N bits is in an activated or deactivated status. The UE processor may be configured to control the UE RF unit to transmit the SPS status information in response to the SPS command. The eNB processor may be configured to control the eNB RF unit to receive the SPS status information in response to the SPS command. The UE processor may be configured to control the UE RF unit to transmit the SPS status information using an SPS resource configuration activated before the SPS command is received. The eNB processor may be configured to control the eNB RF unit to receive the SPS status information using an SPS resource configuration activated before the SPS command is transmitted. The SPS feedback may be received/transmitted via a medium access control (MAC) signaling. For example, the SPS feedback may be received/transmitted in a MAC control element (CE).

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method for receiving, by a user equipment (UE), downlink signals, the method comprising:
   receiving, by the UE, semi-persistent scheduling (SPS) configuration information on N SPS resource configurations, where N is an integer larger than 1;
   receiving, by the UE, an SPS command to activate or deactivate each of multiple SPS resource configurations among the N SPS resource configurations;
   transmitting, by the UE, SPS status information on the N SPS resource configurations in response to the SPS command; and
   performing, by the UE, downlink reception or uplink transmission in an SPS resource corresponding to an SPS resource configuration among activated SPS resource configurations,
   wherein the SPS command includes information indicating each of the multiple SPS resource configurations and information indicating whether a corresponding SPS resource configuration is activated or deactivated,
   wherein the SPS status information includes information on whether the N SPS resource configurations are active or not in the UE, respectively, and
   wherein the SPS status information is transmitted on a first SPS resource of a union of the activated SPS resource configurations.

2. The method according to claim 1,
   wherein the SPS command includes a bitmap including N bits respectively corresponding to the N SPS resource configurations,
   wherein each bit of the N bits is corresponding to an index of each of the N SPS resource configurations and indicates whether an SPS resource configuration corresponding to a bit of the N bits is activated or deactivated.

3. The method according to claim 1,
   wherein the SPS command includes an index of each of the multiple SPS resource configuration and an indicator indicating whether an SPS resource configuration corresponding to the index is activated or deactivated.

4. The method according to claim 1,
   wherein the SPS command is received via a medium access control (MAC) signaling.

5. The method according to claim 2, further comprising:
   activating an SPS resource configuration corresponding to a bit set to a first value among the N bits; and
   deactivating an SPS resource configuration corresponding to a bit set to a second value among the N bits.

6. The method according to claim 3, further comprising:
   maintaining an activated or deactivated state of an SPS resource configuration not indicated by the SPS command.

7. A user equipment (UE) for receiving downlink signals, the UE comprising:
   a radio frequency (RF) unit; and
   a processor configured to control the RF unit, the processor configured to:
   control the RF unit to receive semi-persistent scheduling (SPS) configuration information on N SPS resource configurations, where N is an integer larger than 1;
   control the RF unit to receive an SPS command to activate or deactivate each of multiple SPS resource configurations among the N SPS resource configurations;
   control the RF unit to transmit SPS status information on the N SPS resource configurations in response to the SPS command; and control the RF unit to perform downlink reception or uplink transmission in an SPS resource corresponding to an SPS resource configuration among activated SPS resource configurations, wherein the SPS command includes information indicating each of the multiple SPS resource configurations and information indicating whether a corresponding SPS resource configuration is activated or deactivated, wherein the SPS status information includes information on whether the N SPS resource configurations are active or not in the UE, respectively, and wherein the SPS status information is transmitted on a first SPS resource of a union of the activated SPS resource configurations.

8. The UE according to claim 7, wherein the SPS command includes a bitmap including N bits respectively corresponding to the N SPS resource configurations, wherein each bit of the N bits is corresponding to an index of each of the N SPS resource configurations and indicates whether an SPS resource configuration corresponding to a bit of the N bits is activated or deactivated.

9. The UE according to claim 7, wherein the SPS command includes an index of each of the multiple SPS resource configuration and an indicator indicating whether an SPS resource configuration corresponding to the index is activated or deactivated.

10. The UE according to claim 7, wherein the SPS command is received via a medium access control (MAC) signaling.

11. The UE according to claim 8, wherein the processor is configured to:

activate an SPS resource configuration corresponding to a bit set to a first value among the N bits; and deactivate an SPS resource configuration corresponding to a bit set to a second value among the N bits.

12. The UE according to claim 9, wherein the processor is configured to:

maintain an activated or deactivated state of an SPS resource configuration not indicated by the SPS command.

* * * * *